(12) United States Patent
Moser et al.

(10) Patent No.: US 6,579,566 B1
(45) Date of Patent: *Jun. 17, 2003

(54) ONE-COMPONENT EPOXY RESIN SYSTEM FOR TRICKLE IMPREGNATION AND HOT DIP ROLLING

(75) Inventors: Roland Moser, Basel (CH); Daniel Bär, Riehen (CH); Carl W. Mayer, Riehen (CH)

(73) Assignee: Vantico Inc., Brewster, NY (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 793 days.

(21) Appl. No.: 08/999,803

(22) Filed: May 20, 1997

Related U.S. Application Data

(63) Continuation of application No. 08/400,918, filed on Mar. 8, 1995, now abandoned.

(30) Foreign Application Priority Data

Mar. 16, 1994 (CH) ................................. 781/94

(51) Int. Cl.[7] .............................. B05D 5/12; B05D 3/02; B05D 1/18
(52) U.S. Cl. .................... 427/116; 427/386; 427/430.1; 427/435; 427/434.6
(58) Field of Search ................................ 427/116, 386, 427/430.1, 434.6, 435

(56) References Cited

U.S. PATENT DOCUMENTS

| | | | | |
|---|---|---|---|---|
| 3,759,302 A | * | 9/1973 | Attenborough ............. | 140/119 |
| 4,391,947 A | | 7/1983 | Sassano ....................... | 525/11 |
| 4,393,185 A | * | 7/1983 | Berner et al. ................. | 528/27 |
| 4,472,482 A | | 9/1984 | Sato et al. ................... | 428/377 |
| 4,868,288 A | | 9/1989 | Meier .......................... | 534/15 |
| 5,242,715 A | | 9/1993 | Schoen et al. .............. | 427/386 |
| 5,466,492 A | * | 11/1995 | Kiessling .................... | 427/522 |
| 5,474,799 A | * | 12/1995 | Thigpen et al. ............ | 427/104 |
| 5,506,313 A | * | 4/1996 | Flury et al. ................. | 525/523 |

FOREIGN PATENT DOCUMENTS

| | | | | |
|---|---|---|---|---|
| DE | 1445263 | | 4/1970 | |
| DE | 3230426 | | 4/1983 | ........... H01B/17/62 |
| DE | 0540466 | * | 5/1995 | ........... C08G/59/68 |
| EP | 0066543 | | 12/1982 | ........... C08G/59/68 |
| EP | 0094915 | | 1/1987 | ............. G03L/1/68 |
| EP | 0504569 | | 9/1992 | ........... C08G/59/68 |
| EP | 0540466 | * | 5/1993 | |
| GB | 973377 | | 10/1964 | |

OTHER PUBLICATIONS

H. Batzer: "Polymere Werkstoffe", Georg Thieme Verlag 1984, vol. III, pp. 307–309.
Derwent Abstract 93–145790/18 of EP540466.

* cited by examiner

*Primary Examiner*—Michael Barr
(74) *Attorney, Agent, or Firm*—Proskauer Rose, LLP

(57) ABSTRACT

The present invention relates to a process for preparing resin impregnated wire windings by trickling an impregnating resin onto a heated rotating winding or by dipping the heated rotating winding in a bath filled with an impregnating resin. The impregnating resin comprises an epoxy resin and an initiator for the polymerization of the epoxy resin. The initiator is either a selected compound that is activated by ultraviolet irradiation, a heat-activatible initiator, or a mixture thereof. The heat-activatible initiator is a mixture comprising at least one quarternary ammonium salt and at least one thermal radical former.

8 Claims, No Drawings

ONE-COMPONENT EPOXY RESIN SYSTEM FOR TRICKLE IMPREGNATION AND HOT DIP ROLLING

This application is a continuation, of application Ser. No. 08/400,918, filed Mar. 8, 1995.

The present invention relates to a process for fixing wire coils (windings) by trickling an impregnating resin on to the heated rotating coil or by dipping the heated rotating coil in a bath filled with an impregnating resin, which process comprises using as impregnating resin a composition comprising an epoxy resin and a blocked polymerisation initiator.

Wire coils of rotors or stators are frequently impregnated with suitable insulating resins to afford protection against harmful environomental influences and to enhance their mechanical strength. Thus, for example, in the manufacture of electromotors the windings are fixed on a support by means of an insulating varnish.

A conventional method of impregnating wire coils is dip impregnation using solvent-based impregnating varnishes. The dip impregnation method, however, cannot be satisfactorily integrated into continuous in-line production, as the dripping and the evaporation of the solvent are very time-consuming. Good impregnation can only be achieved by repeated dipping and applying a vacuum. Moreover, the use of solvent-based varnishes is ecologically undesirable.

For these reasons, methods like trickle impregnation and hot dip rolling using solventless impregnating resins are being increasingly used at the present time.

In trickle impregnation, the resin is dripped on to the heated winding that rotates at a moderate speed until complete impregnation is achieved. The subsequent cure can be effected cold or at elevated temperature, depending on the trickle resin employed.

In the hot dip rolling method too the rotor or stator is preheated in an oven (oven temperature c. 200° C.). The heated rotor or stator is then fixed on an apparatus and dipped, while rotating, into an impregnating bath filled with the insulating resin. After complete impregnation of the windings, the rotor or stator is removed from the impregnating bath while continuing to rotate until the insulating resin has gelled. It may be necessary to effect a postbake in an oven.

Unsaturated polyester resins and epoxy resins are often used in trickle impregnation and hot dip rolling (q.v. inter alia H. Batzer: "Polymere Werkstoffe", Georg Thieme Verlag 1984, Volume III, pp. 307–309). These resins, however, are two-component systems, i.e. resin and hardener have to be stored separately and are not mixed until shortly before application. This means that a fairly complicated metering and mixing process is necessary before impregnation when using these systems. Moreover, the processing time after mixing the individual components, the so-called pot life, is often too short when using two-component resins.

There is therefore a need to provide one-component impregnating systems which are storage-stable at room temperature and can be used, without prior mixing, direct for trickle impregnation and hot dip rolling.

Suitable one-component systems are the polyester imides disclosed in DE-A 1 445 263. The mechanical properties, especially flexibility, of the cured polyester imide resins are, however, substantially poorer than those of corresponding epoxy resins. Moreover, the use of polyester imides is toxicologically undesirable because of the high concentration of volatile products.

Unexpectedly, it has now been found that epoxy resins can be used in combination with specific blocked polymerisation initiators as storage-stable one-component impregnating resins which, after deblocking, have a long pot life and afford products that have excellent mechanical properties. The use of such resins for trickle impregnation or hot dip rolling is also advantageous for toxicological and environmental reasons, as virtually no volatile cleavage products occur.

Accordingly, the invention relates to a process for fixing wire windings by trickling an impregnating resin on to the heated rotating winding or by dipping the heated rotating winding in a bath filled with an impregnating resin, which process comprises using as impregnating resin a composition comprising (A) an epoxy resin and (B) an initiator for the polymerisation of the epoxy resin, said initiator (B) being one of the following components (B1) or (B2) or a mixture of (B1) and (B2), and (B1) a compound which is activatable by UV irradiation of formula I, IIa, IIb or IIc

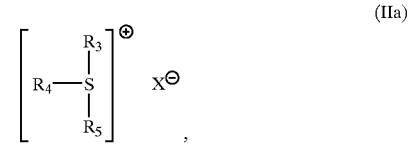

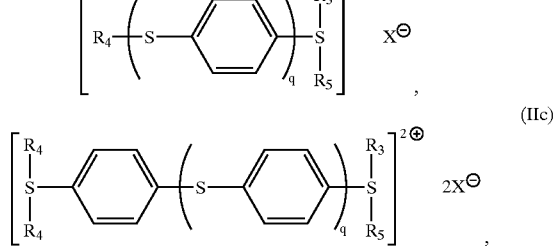

wherein a and b are each independently of the other 1 or 2, $R_1$ is a π-arene, $R_2$ is a π-arene or the anion of a π-arene, $R_3$, $R_4$ and $R_5$ are each independently of one another $C_1$–$C_{18}$allyl, $C_2$–$C_{18}$alkenyl or $C_5$–$C_{18}$aryl, each unsubstituted or substituted by one or more than one member selected from the group consisting of alkyl, alkoxy, phenyl, amino, alkylamino, dialkylamino and halogen, q is an integer from 1 to 10, $[X]^\ominus$ is an anion $[LQ_m]^\ominus$ or an anion of a partially fluorinated or perfluorinated aliphatic or aromatic sulfonic acid, L is B, P, As or Sb, Q is fluoro, and some of the substituents Q may also be hydroxyl groups, and m corresponds to the valency of L increased by one, and (B2) is a heat-activatible initiator consisting of a mixture comprising (a) at least one quarternary ammonium salt of an aromatic-heterocyclic compound which contains 1 or 2 nitrogen atoms, and of a complex halide anion selected from the group consisting of $BF_4^\ominus$, $PF_6^\ominus$, $SbF_6^\ominus$, $SbF_5(OH)^\ominus$ and $AsF_6^\ominus$, and (b) at least one thermal radical former (b1), (b2), (b3) or (b4), wherein (b1) is a diarylethane derivative of formula III

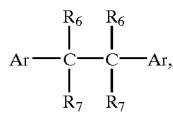

(III)

wherein Ar is phenyl, naphthyl, or $C_1$–$C_4$alkyl- or chloro-substituted phenyl, $R_6$ is hydroxy, $C_1$–$C_4$alkoxy, —O—CO—$R_8$ or —OSi$R_9R_{10}R_{11}$, wherein $R_8$ is $C_1$–$C_8$alkyl or phenyl, and $R_9$, $R_{10}$ and $R_{11}$ are each independently of one another $C_1$–$C_4$alkyl or phenyl, and $R_7$ is $C_1$–$C_4$alkyl or cyclohexyl or has the same meaning as Ar, (b2) is an oligomer of formula IV

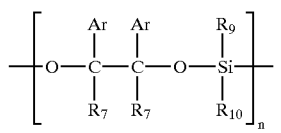

(IV)

wherein Ar, $R_7$, $R_9$ and $R_{10}$ have the same meaning as in formula II and n is 2–20, (b3) is an organic peroxy compound, and (b4) is a quinone.

Component (A) in the process of this invention may in principle be any compound commonly employed in the art of epoxy resins. Illustrative examples of suitable epoxy resins are:

I) Polyglycidyl and poly(β-methylglycidyl) esters which are obtainable by reacting a compound containing at least two carboxyl groups in the molecule with epichlorohydrin or β-methylepichlorohydrin. The reaction is conveniently carried out in the presence of a base.

Compounds containing at least two carboxyl groups in the molecule may suitably be aliphatic polycarboxylic acids. Examples of such polycarboxylic acids are oxalic acid, succinic acid, glutaric acid, adipic acid, pimelic acid, sebacic acid, suberic acid, azelaic acid or dimerised or trimerised linoleic acid. It is, however, also possible to use cycloaliphatic polycarboxylic acids such as tetrahydrophthalic acid, 4-methyltetrahydrophthalic acid, hexahydrophthalic acid or 4-methylhexahydrophthalic acid. Aromatic polycarboxylic acids can also be used, typically phthalic acid, isophthalic acid and terephthalic acid.

II) Polyglycidyl or poly(β-methylglycidyl) ethers which are obtainable by reacting a compound containing at least two free alcoholic hydroxyl groups and/or phenolic hydroxyl groups and epichlorohydrin or β-methylepichlorohydrin, under alkaline conditions or in the presence of an acid catalyst and subsequent treatment with an alkali.

Ethers of this type may be derived from acyclic alcohols, typically from ethylene glycol, diethylene glycol and higher poly(oxyethylene) glycols, 1,2-propanediol or poly(oxypropylene) glycols, 1,3-propanediol, 1,4-butanediol, poly(oxytetramethylene) glycols, 1,5-pentanediol, 1,6-hexanediol, 2,4,6-hexanetriol, glycerol, 1,1,1-trimethylolpropane, pentaerythritol, sorbitol, as well as from polyepichlorohydrins. They may also be derived from cycloaliphatic alcohols such as 1,3- or 1,4-dihydroxycyclohexane, 1,4-cyclohexanedimethanol, bis(4-hydroxycyclohexyl)methane, 2,2-bis(4-hydroxycyclohexyl)propane or 1,1-bis(hydroxymethyl)cyclohex-3-ene, or they contain aromatic nuclei such as N,N-bis(2-hydroxyethyl)aniline or p,p'-bis(2-hydroxyethylamino)diphenylmethane.

The epoxy compounds may also be derived from mononuclear phenols, typically from resorcinol or hydroquinone, or they are derived from polynuclear phenols such as bis(4-hydroxyphenyl)methane, 4,4'-dihydroxybiphenyl, bis(4-hydroxyphenyl)sulfone, 1,1,2,2-tetrakis(4-hydroxyphenyl)ethane, 2,2-bis(4-hydroxyphenyl)propane, 2,2-bis(3,5-dibromo-4-hydroxyphenyl)propane, as well as from novolaks obtainable by condensation of aldehydes such as formaldehyde, acetaldehyde, chloral or furfuraldehyde, with phenols such as preferably phenol or cresol, or with phenols which are substituted in the nucleus by chlorine atoms or $C_1$–$C_9$alkyl groups, for example 4-chlorophenol, 2-methylphenol or 4-tert-butylphenol, or which are obtainable by condensation with bisphenols of the type cited above.

II) Poly-(N-glycidyl) compounds obtainable by dehydrochlorination of the reaction products of epichlorohydrin with amines which contain at least two amino hydrogen atoms. These amines are typically aniline, n-butylamine, bis(4-aminophenyl)methane, m-xylylenediamine or bis(4-methylaminophenyl)methane. The poly(N-glycidyl) compounds also include triglycidyl isocyanurate, N,N'-diglycidyl derivatives of cycloalkylene ureas such as ethylene urea or 1,3-propyleneurea, and diglycidyl derivatives of hydantoins, typically of 5,5-dimethylhydantoin.

IV) Poly(S-glycidyl) compounds, preferably bis(S-glycidyl) derivatives which are derived from dithiols such as 1,2-ethanediol or bis(4-mercaptomethylphenyl) ether.

V) Cycloaliphatic epoxy resins, including bis(2,3-epoxycyclopentyl) ether, 2,3-epoxycyclopentyl glycidyl ether, 1,2-bis(2,3-epoxycyclopentyloxy)ethane or 3,4-epoxycyclohexylmethyl-3',4'-epoxycyclohexanecarboxylate.

It is also possible to use epoxy resins in which the 1,2-epoxy groups are attached to different hetero atoms or functional groups. These compounds typically comprise the N,N,O-triglycidyl derivative of 4-aminophenol, the glycidyl ether-glycidyl ester of salicylic acid, N-glycidyl-N'-(2-glycidyloxypropyl)-5,5-dimethylhydantoin or 2-glycidyloxy-1,3-bis(5,5-dimethyl-1-glycidylhydantoin-3-yl)propane.

It is preferred to use epoxy resins based on diglycidyl ethers of a bisphenol, preferably diglycidyl ethers of bisphenol A or bisphenol F.

Also suitable for use as component A are epoxy resins based on polyglycidyl esters of polycarboxylic acids, preferably diglycidyl phthalate, diglycidyl hexahydrophthalate, or triglycidyl trimellitate.

Other preferred components A are epoxy resins based on trimethylolpropane triglycidyl ether or cycloaliphatic epoxy resins.

The impregnating resins used in the process of this invention are storage-stable one-component systems: i.e. epoxy resin and hardener or polymerisation inhibitor do not react at room temperature with each other and therefore do not need to be stored separately. This necessitates the use of so-called "blocked" initiators which are normally inert to epoxides and do not catalyse the polymerisation of the epoxy resin until after "deblocking". Depending on the type of initiator employed, this deblocking can be effected by UV radiation and/or heating to elevated temperature.

Accordingly, initiators (B1) which can be activated by UV radiation as well as initiators (B2) which can be activated by heat are suitable for use as component (B) of the novel impregnating resins. It is of course also possible to use mixtures of (B1) and (B2).

Suitable initiators (B1) are the ferrocenes of formula I as well as the sulfonium salts of formulae IIa–IIc.

Suitable π-arenes $R_1$ and $R_2$ for the compounds of formula I are preferably carbocyclic-aromatic hydrocarbons of 6 to 24, preferably of 6 to 12, carbon atoms, or heterocyclic-aromatic hydrocarbons of 4 to 11 carbon atoms which contain one or two S and/or O atoms, which groups may be substituted by one or more, preferably by one or two, identical or different monovalent radicals, suitably halogen atoms, preferably chlorine or bromine atoms, or $C_1$–$C_8$alkyl, $C_1$–$C_8$alkoxy or phenyl groups. These π-arene groups can be mononuclear, fused polynuclear or non-fused polynuclear systems, in which last mentioned systems the nuclei may be linked direct or through linking groups such as —$CH_2$—, —$C(CH_3)_2$—, —O—, —S—, —$SO_2$—, —CO— or —CH=CH—. $R_2$ can also be an indenyl anion and, preferably, a cyclopentadienyl anion, which anions may also be substituted by one or more, preferably by one or two, identical or different monovalent radicals mentioned above as substituents of π-arenes. The alkyl or alkoxy substituents can be straight chain or branched. Typical alkyl or alkoxy substituents are methyl, ethyl, n-propyl, isopropyl, n-butyl, sec-butyl, tert-butyl, n-pentyl, n-hexyl and n-octyl, methoxy, ethoxy, n-propoxy, isopropoxy, n-butoxy, n-hexyloxy and n-octyloxy. Preferred substituents are alkyl and alkoxy groups containing 1 to 4 and, preferably 1 or 2, carbon atoms in the alkyl moieties. Preferred substituted π-arenes or substituted indenyl or cyclopentadienyl anions are those that contain one or two of the above mentioned substituents, in particular methyl, ethyl, n-propyl, isopropyl, methoxy or ethoxy groups. $R_1$ and $R_2$ may be identical or different π-arenes.

Illustrative examples of suitable π-arenes are benzene, toluene, xylenes, ethyl benzene, cumene, methoxybenzene, ethoxybenzene, dimethoxybenzene, p-chlorotoluene, m-chlorotoluene, chlorobenzene, bromobenzene, dichlorobenzene, trimethylbenzene, trimethoxybenzene, naphthalene, 1,2-dihydronaphthalene, 1,2,3,4-tetrahydronaphthalene, methylnaphthalene, methoxynaphthalene, ethoxynaphthalene, chloronaphthalene, bromonaphthalene, biphenyl, stilbene, indene, 4,4'-dimethylbiphenyl, fluorene, phenanthrene, anthracene, 9,10-dihydroanthracene, triphenyl, pyrene, perylene, naphthacene, coronene, thiophene, chromene, xanthene, thioxanthene, benzofuran, benzothiophene, naphthothiophene, thianthrene, diphenylene oxide and diphenylene sulfide.

Illustrative examples of anions of substituted cyclopentadienes are the anions of methyl-, ethyl-, n-propyl- and n-butylcyclopentadiene or the anions of dimethylcyclopentadiene. Preferred anions are the anion of unsubstituted indene and, in particular, of unsubstituted cyclopentadiene.

The index a is preferably 1. The index b is preferably 1. When a is 2, $R_2$ is preferably the unsubstituted or substituted indenyl anion or, preferably, the cyclopentadienyl anion.

$X^{\ominus}$ is preferably the anion of a perfluoroaliphatic or perfluoroaromatic sulfonic acid and, most preferably, $[LQ_m]^{\ominus}$, as defined above.

Typical examples of anions of perfluoroaliphatic or perfluoroaromatic sulfonic acids are $CF_3SO_3^{\ominus}$, $C_2F_5SO_3^{\ominus}$, n-$C_3F_7SO_3^{\ominus}$, n-$C_4F_9SO_3^{\ominus}$, n-$C_6F_{13}SO_3^{\ominus}$, $C_6F_5SO_3^{\ominus}$ and $CF_3C_6F_4SO_3^{\ominus}$. $CF_3SO_3^{\ominus}$ is preferred.

Typical examples of particularly preferred anions $[LQ_m]^{\ominus}$ are $PF_6^{\ominus}$, $AsF_6^{\ominus}$, $SbF_6^{\ominus}$ and $SbF_5(OH)^{\ominus}$. $PF_6^{\ominus}$ and $SbF_6^{\ominus}$ are very particularly preferred, and $SbF_6^{\ominus}$ is most preferred. Compositions which contain compounds of formula I containing $SbF_6^{\ominus}$ as anion can be cured by irradiation at very low temperature after deblocking.

The compounds of formula I are known per se or can be prepared by methods analogous to those for obtaining known compounds. The preparation of salts in which $X^{\ominus}$= $[LQ_m]^{\ominus}$ is disclosed in EP-A-94 915. Compounds of formula I containing other anions can be prepared by methods differing from those described therein by introducing instead of an anion of a complex acid another anion of the acid HX, wherein X is as defined above, in per se known manner.

In the process of this invention component (B1) will preferably be a compound of formula (I), wherein a is 1, $R_1$ is benzene, toluene, cumene, methoxybenzene, chlorobenzene, p-chlorotoluene, naphthalene, methylnaphthalene, chloronaphthalene, methoxynaphthalene, biphenyl, indene, pyrene or diphenyl sulfide, and $R_2$ is the anion of cyclopentadiene, acetylcyclopentadiene or indene, or is benzene, toluene, xylene, mesitylene, naphthalene or methylnaphthalene. $^{\ominus}$A particularly preferred component (B1) a compound of formula (I), wherein a and b are each 1, $R_1$ is cumene and $R_2$ is the anion of cyclopentadiene.

Other preferred compounds of formula (I) suitable for use as component (B1) are those wherein $[LQ_m]^{(a \cdot b)\ominus}$ is $PF_6^{\ominus}$ or $SbF_6^{\ominus}$.

The sulfonium salts of formulae IIa–IIc are also known and described, inter alia, in U.S. Pat. No. 4,554,342.

The substituents $R_3$, $R_4$ and $R_5$ may be straight-chain or branched substituents which may be substituted by alkyl, alkoxy, phenyl, amino, alkylamino, dialkylamino groups or halogen atoms.

Typical examples of suitable substituents are methyl, ethyl, n-propyl, isopropyl, n-butyl, sec-butyl, tert-butyl, n-pentyl, n-hexyl, n-octyl, allyl, methallyl, vinyl, 2-allyloxyethyl, phenyl, naphthyl and benzyl.

Examples of suitable sulfonium salts of formula I are triethylsulfonium tetrafluoroborate, methyldiphenylsulfonium tetrafluoroborate, ethyldiphenylsulfonium tetrafluoroborate, allyldimethylsulfonium tetrafluoroborate, allyl bis(2-allyloxyethyl)sulfonium tetrafluoroborate and trimethylsulfonium hexafluorophosphate.

Suitable sulfonium salts of formulae IIb and IIc are preferably the compounds of formulae IIb1, IIb2, IIc1 and IIc contained in the commercial products Cyracure® UVI 6974 and Cyracure® UVI 6990 (Union Carbide):

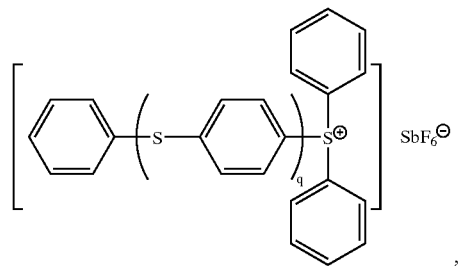

(IIb1)

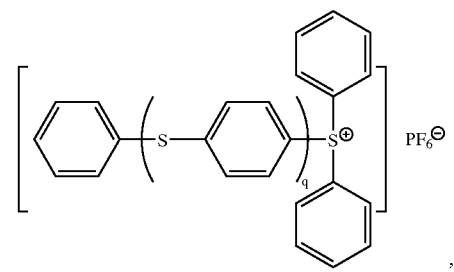

(IIb2)

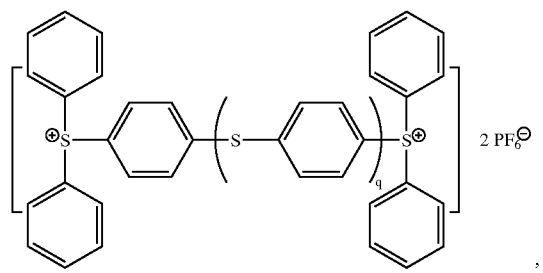

(IIc1)

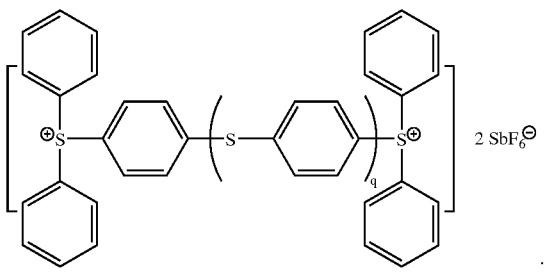

(IIc2)

As suitable thermal polymerisation initiators B2 it is possible to use the mixtures of heterocyclic ammonium salts (a) and thermal radical formers (b) disclosed in EP-A 0 066 543.

The quaternary ammonium salts used as component (a) are salts of aromatic-heterocyclic nitrogen bases with complex halide anions. Ilustrative examples of aromatic-heterocyclic nitrogen bases are in particular six-membered N-heterocycles such as pyridine, pyrimidine, pyridazine and pyrazine and the alkyl or aryl derivatives thereof, benzo and naphtho derivatives such as picoline, lutidine, quinoline, isoquinoline, quinoxaline, phthalazine, quinazoline, acridine, phenanthridine or phenanthroline.

Preferred ammonium salts for component (a) are those of formulae V, VI or VII wherein $R_{12}$ is $C_1$–$C_{12}$alkyl, $C_7$–$C_{20}$aralkyl, $C_3$–$C_{15}$alkoxyalkyl or benzoylmethyl, $R_{13}$, $R_{14}$, $R_{15}$, $R_{16}$ and $R_{17}$ are each independently of one another hydrogen, $C_1$–$C_4$alkyl or phenyl, or $R_{13}$ and $R_{14}$ or $R_{14}$ and $R_{15}$ or $R_{15}$ and $R_{16}$ or $R_{16}$ and $R_{17}$, together with the two carbon atoms to which they are attached, form a fused benzo, naphtho-, pyridino or quinolino, and Y is $BF_4$, $PF_6$, $SbF_6SbF_5(OH)$ or $AsF_6$.

Illustrative examples of compounds of formulae V–VII are: 1-methylquinolinium hexafluorophosphate, 1-methylquinolinium hexafluoroantimonate, 1-methylquinolinium hexafluoroarsenate, 1-methylquinolinium pentafluorohydroxyantimonate, 1-methylquinolinium tetrafluoroborate, 1,2-dimethylquinolinium hiexafluorophosphate, 1-ethylquinolinium hexafluorophosphate, 1-butylquinolinium hexafluorophosphate, 1-benzoylmethylquinolinium hexafluorophosphate, 1-benzoylmethylquinolinium hexafluoroantimonate, 1-benzylquinolinium hexafluoroantimonate, 1-methyl-2,3-diphenylpyridinium hexafluorophosphate, 1,2-dimethyl-3-phenylpyridinium hexafluorophosphate, 1-benzoylmethylpyridinium hexafluorophosphate, 1-ethoxyethylquinolinium hexafluorophosphate, 2-methylisoquinolinium hexafluorophosphate, 10-methylacridinium hexafluorophosphate, 10-benzoylmethylacridinium hexafluorophosphate, 10-butylacridinium hexafluoroarsenate, 5-methylphenanthridinium hexafluorophosphate, 5-benzoylmethylphenanthridinium hexafluorophosphate, 1-methylnaphthyridium hexafluorophosphate, 1-methyl-2,3-diphenylquinoxalinium hexafluorophosphate, 1,2,3-trimethylquinoxalinium hexafluorophosphate, 1,2,4,6-tetramethylpyrimidinium hexafluorophosphate, 1-methyl-2,4-diphenylpyrimidinium hexafluorophosphate, 1-methyl-3-phenylpyridazinium hexafluorophosphate, 1-methyl-2,5-diphenylpyridazinium hexafluorophosphate, 1-methylphenanthrolinium hexafluorophosphate, 5-butylphenazinium hexafluorophosphate, 1-methylquinoxalinium hexafluorophosphate and 1-benzoylmethylquinoxalinium hexafluorophosphate.

It is particularly preferred to use N-benzylquinolinium hexafluoroantimonate as component (a).

The thermal polymerisation initiator B2 requires, in addition to component (a), at least one thermal radical former (b1), (b2), (b3) or (b4). It is of course also possible to use mixtures of different radical formers.

The diarylethane derivatives (b1) are pinacols and the ethers, esters or silyl derivatives thereof. These compounds are known and can be prepared by known methods. Thusa, for example, ketones can be reduced to corresponding pinacols. The derivatives can be obtained therefrom by etherification, esterification or silylation.

Illustrative examples of compounds of formula III which may suitably be used as component (b1) are 1,1,2,2-tetraphenyl-1,2-ethanediol (benzopinacol), benzopinacol dimethyl ether, diethyl ether, diisopropyl ether, diacetate, dipropionate, dibutyrate, dicaprylate or dibenzoate, 1,2-bis (trimethylsiloxy)tetraphenylethane, acetophenone pinacol dimethyl ether, dipropyl ether, dipropyl diacetate, dipropyl divalerate or dipropyl dibenzoate, propiophenone pinacol dimethyl ether, dibutyl ether, dibutyl diacetate, 2,3-diphenyl-2,3-bis(triphenylsiloxy)butane or 3,4-diphenyl-3,4-bis(trimethylsiloxy)hexane.

Preferred components (b1) are the pinacols such as acetophenone pinacol or, preferably, 1,1,2,2-tetraphenyl-1,2-ethanediol (benzopinacol).

The compounds of formula (IV) are oligomeric silyl ethers of pinacols having a molecular weight of c. 500–5000. Typical examples of compounds of formula (IV) are the reaction products of benzophenone, propiophenone or acetophenone with dichlorodimethylsilane or dichlorodiphenylsilane in the presence of magnesium.

Preferred compounds of formula (IV) are those wherein $R_7$ is phenyl and $R_9$ and $R_{10}$ are methyl.

It is also possible to use organic peroxide compounds (b3) as thermal radical formers (b). These compounds can be diorganoperoxides or monoorganohydroperoxides. The organic radical can be in particular an alkyl, cycloalkyl, aralkyl, acyl or aroyl radical. These compounds are known and some are commercially available. Typical examples are: dibenzoyl peroxide, dilauroyl peroxide, dicumyl peroxide, di-tert-butylperoxide, cumyl hydroperoxide, tert-butylhydroperoxide, cumyl tert-butylperoxide, tert-butyl perbenzoate, cyclohexanone peroxide, 2-butanone hydroperoxide, acetylacetone peroxide, tert-butyl peroctoate or tert-butyl peracetate.

Finally, quinones (b4) can also be used as thermal radical forrners (b), for example benzoquinone, naphthoquinone, tetrachlorobenzophenone, 2,3-dichloronaphthoquinone, anthraquinone or tetrachloroanthraquinone. It is preferred to use 2,3-dichloro-5,6-dicyanobenzoquinone.

The compounds suitable for use as component (b) are stable at room temperature and decompose to radicals when heated. If this takes place in the presence of ammonium salts of component (a), then initiators for cationic polymerisation are formed whose structure is not known for certain. Components (a) and (b) also are unable to to initiate the polymerisation of the epoxy resin (A), not even at elevated temperature. By using a mixture of (a) and (b), however, it is possible to polymerise epoxy resins completely in a short time by simple heating. Mixtures of an epoxy resin (A) and an initiator (B2), which is a mixture of a heterocyclic ammonium salt a) and a thermal radical former (b), are one-component systems that are stable at room temperature. Heating to c. 60–200° C., preferably 100–160° C., is necessary to effect polymerisation.

The amount of the two components (a) and (b) necessary for polymerisation will depend on the type of epoxy resin (A) and on the polymerisation conditions. Usually 0.05–8.0% by weight, preferably 0.1–5.0% by weight, of the two components (a) and (b) is used, based on the amount of epoxy resin (A). It is particularly preferred to use 1.0–5.0% by weight, preferably 1.0–2.0% by weight, of component (a), and 1.0–2.0% by weight of component (b).

The polymerisation initiator (B) will normally be used in an amount of 0.05–8.0% by weight, preferably of 0.5–5.0% by weight and, most preferably, of 1.0–2.5% by weight, based on the amount of the epoxy resin (A).

The initiator component (B) can be blended into the epoxy resin (A) by conventional means, typically with stirrers, rollers or kneaders, and is preferably carried out in the temperature range below 50° C.

If necessary, a high-boiling solvent is added as solubiliser to the mixture of components (A) and (B). Usually the solubiliser is added in an amount of 2–25% by weight, preferably 4–20% by weight, based on the epoxy resin (A). A preferred solubiliser is propylene carbonate.

Further modifiers which may be added to the novel impregnating resins are plasticisers, extenders, pigments and dyes such as carbon black, oxide colourants and titanium oxide, as well as flame retardants, antifoams, thixotropic agents, flow control agents, adhesion promoters and antioxidants.

The one-component impregnating resins so obtained have a low viscosity, are storage-stable at temperatures up to c. 50° C., and have an excellent pot-life also after deblocking the initiators (A) by UV radiation or heat. Moreover, the impregnating resins have a very brief gel time, which is useful for continuous production. The impregnating system of this invention has excellent wetting properties and, in contrast to conventional polyamide impregnating resins, requires no additional wetting agent. Any paper or cardboard layers present are also readily impregnated.

The rotor or stator to be impregnated is heated, prior to impregnation, in an oven, so that the temperature of the windings is 110–200° C. at the start of impregnation.

When using a UV activatable initiator (B1), the temperature of the windings is preferably 110–150° C., more particularly 120–140° C.

When using a thermally activatable initiator (B2), the temperature of the windings is preferably 140–200° C., more particularly 150–190° C.

After impregnating the windings by trickle impregnation or hot dip rolling, curing will usually be effected at elevated temperature in an oven. The cure is usually carried out in a temperature range below 200° C., preferably in the range from 50 to 180° C.

An advantage of the novel process is, however, that a postbake can be dispensed with by good alignment of the preheated rotor and the reactivity of the one-component system. The heat produced by preheating the rotor effects a crosslinking reaction extending well beyond the yellow range. The final cure is then effected on the job, i.e. during operation of the rotor or stator.

The cured products are distinguished by good mechanical and electrical properties. Compared with the conventional processes using one-component impregnating resins, for example those based on polyester imides, the process of this invention has the further advantage that no, or only very minor, amounts of volatile cleavage products are generated, and contamination of the air with pollutants is substantially reduced.

The following components are used in the Examples set forth hereinafter.

epoxy resin 1: liquid diglycidyl ether of bisphenol A, epoxy value: 5.25–5.4 eq/kg;
epoxy resin: 2: liquid diglycidyl ether of hexahydrophthalic acid, epoxy value: 5.6–6.2 eq/kg;
    initiator A: $(\eta^6\text{-cumene})(\eta^5\text{-cyclopentadienyl})$ Fe-II hexafluoroantimonate;
    initiator B: $(\eta^6\text{-cumene})(\eta^5\text{-cyclopentadienyl})$ Fe-II-hexafluorophosphate;
    initiator C: mixture of 56 parts by weight of N-benzylquinolinium hexafluoroantimonate and 44 parts by weight of 1,1,2,2-tetraphenyl-1,2-ethanediol;
    initiator D: mixture of 53 parts by weight of N-benzylquinolinium hexafluoroantimonate, 42 parts by weight of 1,1,2,2-tetraphenyl-1,2-ethanediol and 5 parts by weight of 2-ethyl-2-hydroxymethyl-1,3-propanediol;

The properties listed in Table 1 are determined by the following test methods:

Viscosity:
    Rheomat 115 A, measuring system 114 (coaxial);
Gel time:
    DIN 16 945, Gel timer Gelnorm (GEL INSRUMENT AG, Switzerland);
Glass transition temperature $T_g$:
    according to IEC 15a, Mettler TA 3000, heating up rate 10° C./min;
Flexural strength, elongation, modulus of elasticity:
    ISO 178;
Impact strength:
    ISO 179/1D

EXAMPLE 1

With stirring, 1.0 g of initiator A are dissolved at room temperature, and excluding UV radiation (yellow light), in 4 g of propylene carbonate, and the solution is then mixed, again excluding UV radiation, with 99 g of epoxy resin 1. The liquid resin so obtained is storage-stable and can be kept in brown bottles that are additionally wrapped in aluminium foil. Only an insignificant increase in viscosity is observed after long storage (q.v. Table 1).

For activation, a thin layer of the resin (layer thickness: 2–3 mm) is irradiated in a petri dish for 30 seconds with a 5000 watt UV lamp (Ultralux® 5000) positioned at a distance of 30 cm. The formulation so obtained has a long pot-life and is processed in known manner by the trickle method. The activated resin is cast to moulded objects and heat-cured under the conditions shown in Table 1. To measure the mechanical properties, test samples (60 mm·10 mm·4 mm) are cut out. The properties of the activated resin and of the cured mixture are shown in Table 1.

EXAMPLES 2 AND 3

Following the procedure of Example 1, formulations are prepared from epoxy resin 2 and initiator B and cured by UV radiation. The amounts of the components and the properties of the formulations and the cured moulded objects are shown in Table 1.

EXAMPLE 4

1.37 g of initiator C are dissolved at room temperature with very efficient stirring (dissolver) in 97.63 g of epoxy resin 2. The clear solution obtained after c. 1–1.5 h is used, without prior activation, in conventional manner for trickle impregnation. The properties of the formulation and of the cured product are shown in Table 1.

EXAMPLE 5

Following the procedure of Example 1, a formulation is prepared from epoxy resin 2 and initiator D. The properties of the formulations and the cured moulded objects are shown in Table 1.

TABLE 1

|  | Example | | | | |
| --- | --- | --- | --- | --- | --- |
|  | 1 | 2 | 3 | 4 | 5 |
| epoxy resin 1 [g] | 99 |  | 98 |  |  |
| epoxy resin 2 [g] |  | 99 |  | 97.63 | 97.52 |
| initiator A [g] | 1 |  |  |  |  |
| initiator B [g] |  | 1 |  |  |  |
| initiator C [g] |  |  | 4 |  |  |
| initiator D [g] |  |  |  | 2.37 |  |
| propylene carbonate [g] |  |  |  |  | 2.48 |
| viscosity at 25° C. [mPa · s] | 4 | 4 | 16 | — | — |
| of the freshly prepared mixture | 4800 | 510 | 860 | 780 | 730 |
| after storage for 1 month at RT | 5000 | 510 | 860 | 780 | 730 |
| after storage for 3 months at RT |  |  |  | 780 |  |
| after storage for 1 month at 60° C. | 5500 | 570 | 900 |  | 830 |
| after storage for 3 months at 60° C. | 12100 | 1480 |  |  |  |
| gel time |  |  |  |  |  |
| at 80° C. | 1 h 17' | 8 h 06' | 1 h 19' | >24 h | >24 h |

TABLE 1-continued

|  | Example | | | | |
|---|---|---|---|---|---|
|  | 1 | 2 | 3 | 4 | 5 |
| at 100° C. | 18' | 1 h 49' | 7'30" | 4 h 04' | 3 h 49' |
| at 120° C. | 5'10" | 17'30" | 1'30" | 27'10" | 24'10" |
| at 160° C. |  |  |  | 2'40" | 2'20" |
| at 180° C. |  |  |  | 50" | 40" |
| viscosity |  |  |  |  |  |
| after UV radiation | 4800 | 510 | 860 |  |  |
| after storage for 1 day at RT | 5200 |  | 860 |  |  |
| after storage for 1 month at RT |  | 1600 | gelled |  |  |
| curing conditions | 4 h/60° C. | 4 h/60° C. | 4 h/60° C. | 5 h/100° C. | 5 h/100° C. |
|  | 3 h/160° C. | 3 h/160° C. | 3 h/160° C. | 3 h/160° C. | 3 h/160° C. |
| properties of the cured mixture |  |  |  |  |  |
| impact strength [kJ/m$^2$] | 17.5 | 16.3 |  | 23.8 | 15.5 |
| modulus of elasticity [N/mm$^2$] | 3050 | 3860 |  | 3570 | 3660 |
| flexural strength [N/mm$^2$] | 133 | 136 |  | 148 | 148 |
| elongation [%] | 5.5 | 1.7 |  | 6.2 | 6.8 |
| glass transition temperature $T_g$ [° C.] | 115 | 93 | 124 | 91 | 74 |

EXAMPLE 6

Pot-Life 500 g of the one-component epoxy resin system of Example 4 are placed in a sulfonation flask equipped with stirrer (250 rpm) and two gas inlet pipes for feed and discharge and warmed in a water bath to 25° C. The resin is pumped by a peristaltic pump (450 U/min) through an oil bath heated to 180° C. and then recycled to the sulfonation flask. After adjustment of the equilibrium, a temperature rise to 27° C. (storage temperature) is measured in the sulfonation flask. After a 10-day bath cycle only a minor increase in viscosity and decrease of the gel time is measured:

| initial viscosity at 25° C. | 890 mPa · s |
|---|---|
| viscosity after 10-day bath cycle | 920 mPa · s |
| viscosity increase | 3.3% |
| gel time at 160° C: | |
| initially | 2'40" |
| after 10 day bath cycle | 2'26". |

EXAMPLE 7

Hot Dip Roller Method

The rotor to be impregnated is preheated in an oven at 200° C. and then clamped in a drilling machine. While rotating continuously (250 rpm), the rotor is dipped for 10–15 seconds in a bath filled with 50 g of the impregnating resin of Example 4, so that only the windings are impregnated. Afterwards the still rotating rotor is removed from the impregnating bath and, with constant rotation, the resin gels. After cooling, a glass transition temperatur $T_g$ of 80° C. is measured. The postbake (3 h/160° C.) causes only an insignificant increase of the $T_g$ value to 85° C.

EXAMPLE 8

Trickle Impregnation

A rotor preheated to 200° C. is clamped horizontally into a drilling machine (250 U/min). The impregnating resin of Example 4 is then trickled by the binary flow principle on to both winding heads of the preheated rotating rotor (c. 190° C.) until the entire winding is completely impregnated. This occurs when the impregnating resin drips at the ends of the windings. The impregnated rotor is allowed to continue to rotate during cooling, whereupon the trickle resin gels over the course of 2–3 minutes. After cooling, a $T_g$ of 81° C. is measured. The postbake (3 h/160° C.) causes only an insignificant increase of the $T_g$ value to 86° C.

What is claimed is:

1. A process for preparing resin impregnated wire windings comprising
   a) heating said wire windings in an oven to a temperature of about 110 to about 200° C.;
   b) subsequently trickling a one-component impregnating resin, which is storage-stable at room temperature, onto the heated, rotating wire winding or dipping the heated, rotating wire winding in a bath filled with said one-component impregnating resin, wherein the impregnating resin consists essentially of:
      (A) an epoxy resin that is liquid at room temperature; and
      (B) a heat-activatible initiator for the polymerisation of the epoxy resin, the initiator comprising
         (a) at least one quarternary ammonium salt of an aromatic-heterocyclic compound which contains 1 or 2 nitrogen atoms, and of a complex halide anion selected from the group consisting of $BF_4\ominus$, $PF_6\ominus$, $SbF\ominus_6$, $SbF_5(OH)\ominus$ and $AsF_6\ominus$, and
         (b) at least one thermal radical former (b1), (b2), (b3) or (b4), wherein
         (b1) is a diarylethane derivative of formula III

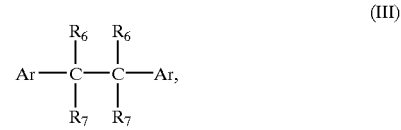

(III)

wherein Ar is phenyl, naphthyl, or $C_1$–$C_4$alkyl- or chloro-substituted phenyl,
$R_6$ is hydroxy, $C_1$–$C_4$alkoxy, —O—C—$OR_8$ or —$OSiR_9R_{10}R_{11}$, wherein $R_8$ is $C_1$–$C_8$alkyl or phenyl, and $R_9$, $R_{10}$ and $R_{11}$ are each independently of one another $C_1$–$C_4$alkyl or phenyl, and $R_7$ is $C_1$–$C_4$alkyl or cyclohexyl or has the same meaning as Ar, (b2) is an oligomer of formula IV

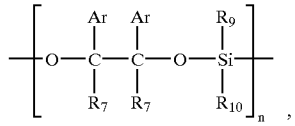

(IV)

wherein Ar, $R_7$, $R_9$ and $R_{10}$ have the same meaning as in formula II and n is 2–20, (b3) is an organic peroxy compound, and (b4) is a quinone.

2. A process according to claim 1, wherein component (A) is an epoxy resin based on the diglycidyl ether of bisphenol A, the diglycidyl ether of bisphenol F or a mixture of the diglycidyl ethers of bisphenol A and bisphenol F.

3. A process according to claim 1, wherein component (A) is an epoxy resin based on diglycidyl phthalate, diglycidylphthalate or triglycidyl trimellitate.

4. A process according to claim 1, wherein component (A) is an epoxy resin based on trimethylolpropane triglycidyl ether or a cycloaliphatic epoxy resin.

5. A process according to claim 1, wherein component (B2) is a mixture in which component (a) is a compound of formula V, VI or VII

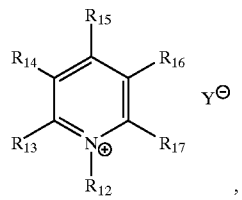

(V)

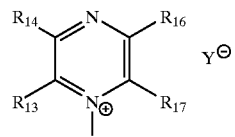

(VI)

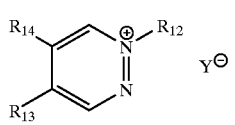

(VII)

wherein $R_{12}$ is $C_1$–$C_{12}$alkyl, $C_7$–$C_{20}$aralkyl, $C_3$–$C_{15}$alkoxyalkyl or benzoylmethyl, $R_{13}$, $R_{14}$, $R_{15}$, $R_{16}$ and $R_{17}$ are each independently of one another hydrogen, $C_1$–$C_4$alkyl or phenyl, or $R_{13}$ and $R_{14}$ or $R_{14}$ and $R_{15}$ or $R_{15}$ and $R_{16}$ or $R_{16}$ and $R_{17}$, together with the two carbon atoms to which they are attached, form a fused benzo, naphtho-, pyridino or quinolino ring, and Y is $BF_4$, $PF_6$, $SbF_6SbF_5$(OH) or $AsF_6$.

6. A process according to claim 1, wherein component (B2) is a mixture in which component (a) is N-benzylquinolinium hexafluoroantimonate.

7. A process according to claim 1, wherein component (B2) is a mixture in which component (b) is 1,1,2,2-tetraphoenyl-1,2-ethanediol.

8. A process according to claim 1, wherein component (B) is used in an amount of 0.05–8.0 parts by weight, based on 100 parts by weight of component (A).

\* \* \* \* \*